United States Patent
Iggulden

(10) Patent No.: US 6,856,758 B2
(45) Date of Patent: Feb. 15, 2005

(54) METHOD AND APPARATUS FOR INSURING COMPLETE RECORDING OF A TELEVISION PROGRAM

(75) Inventor: Jerry Iggulden, Los Angeles, CA (US)

(73) Assignee: TeleVentions, LLC, Los Angeles, CA (US)

( * ) Notice: Subject to any disclaimer, the term of this patent is extended or adjusted under 35 U.S.C. 154(b) by 148 days.

(21) Appl. No.: 10/410,751

(22) Filed: Apr. 9, 2003

(65) Prior Publication Data

US 2004/0202453 A1 Oct. 14, 2004

(51) Int. Cl.$^7$ ................................................. H04N 5/76
(52) U.S. Cl. ............................ 386/83; 725/58; 358/908
(58) Field of Search ....................... 386/1, 83; 348/460; 725/58; 358/908; H04N 5/76, 5/445, 5/78, 5/782, 5/91, 5/93

(56) References Cited

U.S. PATENT DOCUMENTS

| | | | |
|---|---|---|---|
| 5,333,091 A | | 7/1994 | Iggulden |
| 5,692,093 A | | 11/1997 | Iggulden et al. |
| 5,696,866 A | | 12/1997 | Iggulden et al. |
| 5,987,210 A | | 11/1999 | Iggulden et al. |
| 5,999,688 A | | 12/1999 | Iggulden et al. |
| 6,100,941 A | * | 8/2000 | Dimitrova et al. .......... 348/700 |
| 6,226,444 B1 | * | 5/2001 | Goldschmidt Iki et al. ... 386/83 |
| 6,771,885 B1 | * | 8/2004 | Agnihotri et al. ............. 386/83 |
| 6,782,186 B1 | * | 8/2004 | Covell et al. ................. 386/46 |
| 2003/0007777 A1 | * | 1/2003 | Okajima et al. .............. 386/46 |

* cited by examiner

Primary Examiner—Thai Tran
(74) Attorney, Agent, or Firm—Blakely Sokoloff Taylor & Zafman, LLP

(57) ABSTRACT

The duration of a recording is automatically extended in the event that a televised program extends beyond the scheduled end of the television broadcast. Groups or "clusters" of commercial messages are detected. If no such group is found at the end of a scheduled broadcast, it is presumed that the broadcast has been extended and the recording is likewise extended. The invention again looks for a group of commercial messages at the next hour or half-hour. The recording is extended until such a group is found or until the recording has been extended by a predetermined maximum amount of time.

20 Claims, 6 Drawing Sheets

METHOD AND APPARATUS FOR INSURING COMPLETE RECORDING OF A TELEVISION PROGRAM

BACKGROUND OF THE INVENTION

1. Field of the Invention

The present invention relates generally to the field of recording devices, and, more particularly, to a video recording device in which the end time of a recording is automatically adjusted to accommodate a program that extends beyond the scheduled end time.

2. Background

Video recording devices have become nearly as commonplace as television sets. Such devices are widely used to record a television program as it is broadcast so that it may be viewed at a later, more convenient time. This practice is often referred to as "time shifting". In order to record a television program, the recording device must be programmed with the channel on which the television program is to be broadcast, the time when the television program is to begin and the duration of the television program. In lieu of duration, the recording device may be programmed with the time when the television program is to end.

Television broadcast schedules are established well in advance, so it is a relatively straightforward matter to program a recording device to record a desired television program. However, certain televised programs, such as sporting events, awards ceremonies and the like, may extend beyond the time allotted in the television schedule. Generally, the television broadcast will likewise be extended so that the viewers may see the conclusion of the event. Individuals who frequently record television programs for time shifting purposes may anticipate that a televised program may extend beyond its scheduled end time and program the recording device accordingly. However, failing this, the recording device will automatically terminate a recording at the scheduled end of the broadcast. This can cause considerable annoyance when the televised program extends beyond the scheduled end of the broadcast.

SUMMARY OF THE INVENTION

The present invention provides a method and apparatus for automatically extending the duration of a recording in the event that a televised program extends beyond the scheduled end of the television broadcast. It is known that television broadcasts are generally scheduled to end on the hour or half-hour. The end of a broadcast is almost always accompanied by a number of commercial messages prior to the commencement of the next broadcast. The present invention detects these groups or "clusters" of commercial messages. If no such group is found at the end of a scheduled broadcast, it is presumed that the broadcast has been extended and the recording is likewise extended. The invention again looks for a group of commercial messages at the next hour or half-hour. The recording is extended until such a group is found or until the recording has been extended by a predetermined maximum amount of time.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

This inventor's prior issued U.S. Pat. Nos. 5,333,091; 5,692,093; 5,696,866; 5,987,210; and 5,999,688 disclose a system for automatically skipping commercial messages upon replay of a previously recorded television program. Recording products incorporating this system have been commercially marketed under the trademark COMMERCIAL ADVANCE®. This system detects television commercials by first detecting "events" in the television signal. In accordance with North American broadcast practices, such events include the absence of video, which is often referred to as a "black frame" and the absence of audio, sometimes referred to as a "silent frame". The system analyzes the temporal spacing between events and declares the presence of a commercial if the spacing satisfies a set of rules. For example, the most common commercials are thirty seconds and sixty seconds in length. Thus, if a pair of events is found with a spacing of thirty seconds or sixty seconds, the broadcast content between such events is presumed to be a commercial message. In North America, commercials are seldom broadcast individually, but are usually presented in groups or clusters. Detected commercials are further analyzed to determine the presence of a group. For example, one test for a commercial group may require a minimum of two detected commercials and a minimum group length of fifty-nine seconds.

Figure 1:
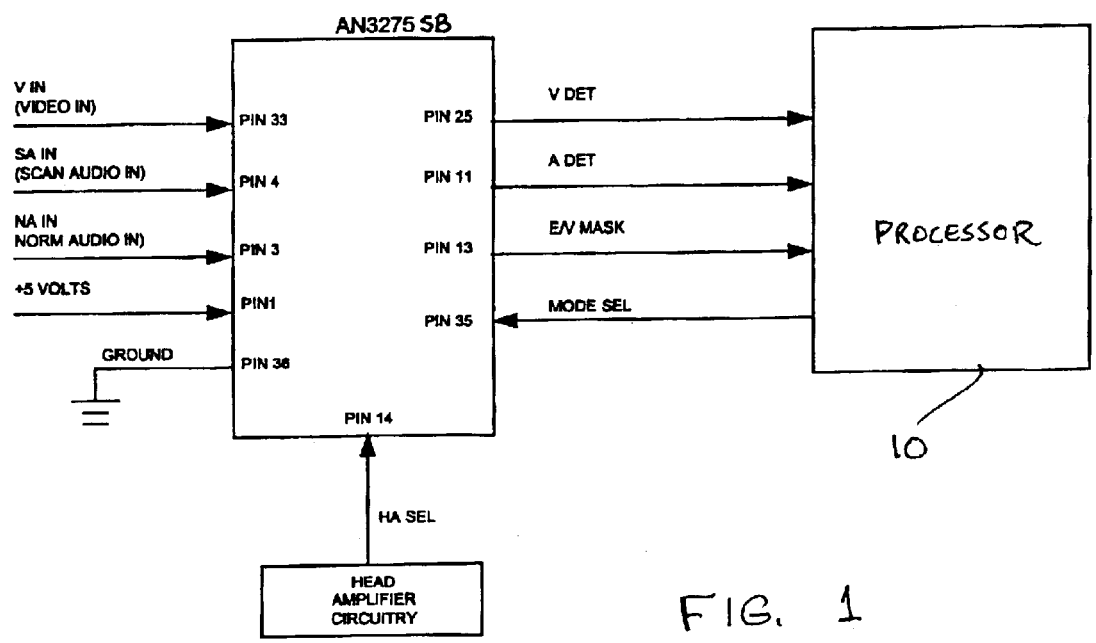
FIG. 1 is a functional block diagram of a video recorder for implementing the present invention.
Figure 2A:
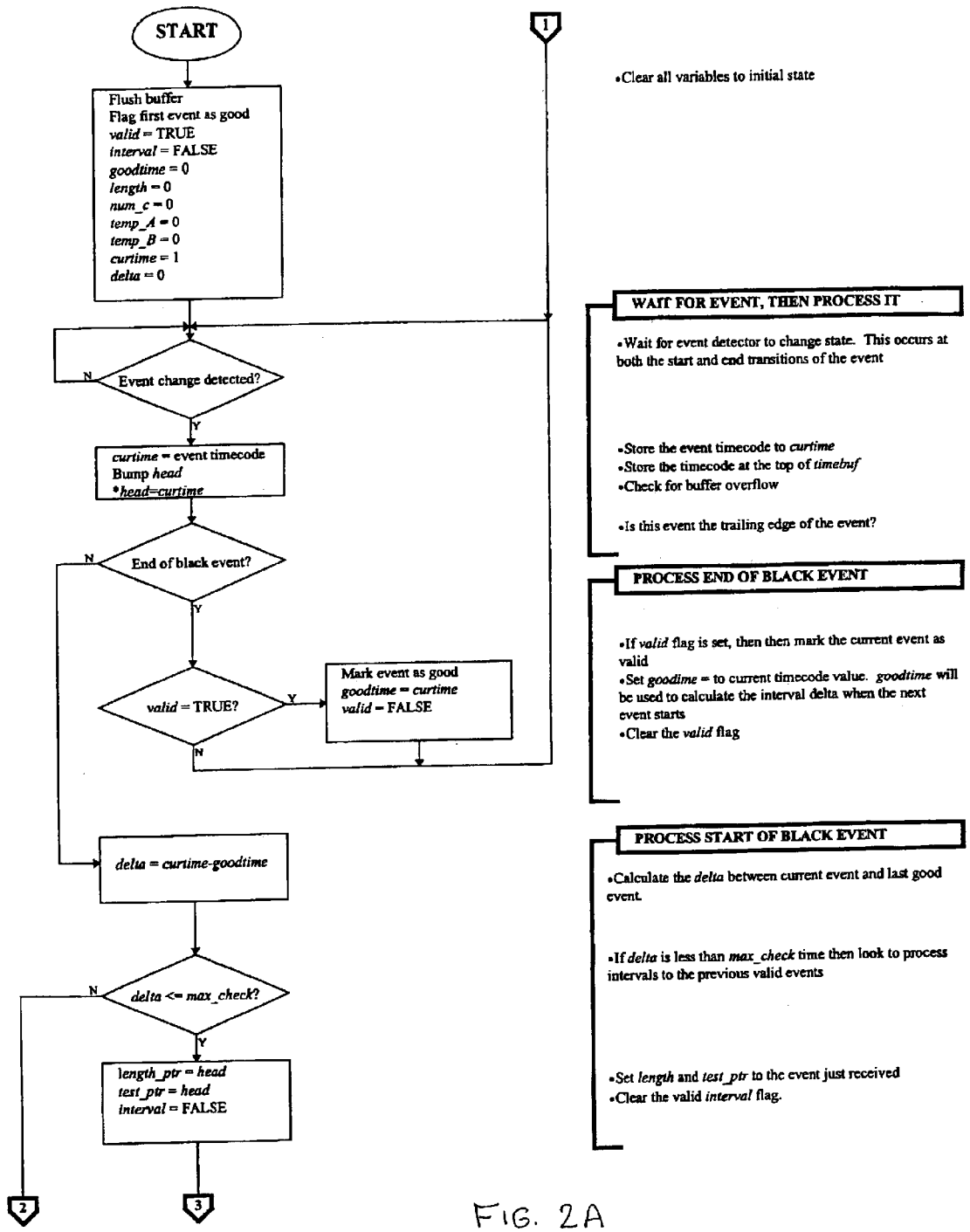
FIGS. 2A–2D are a functional flow diagram of a process for recognizing commercial clusters suitable for use with the present invention.
Figure 2B:
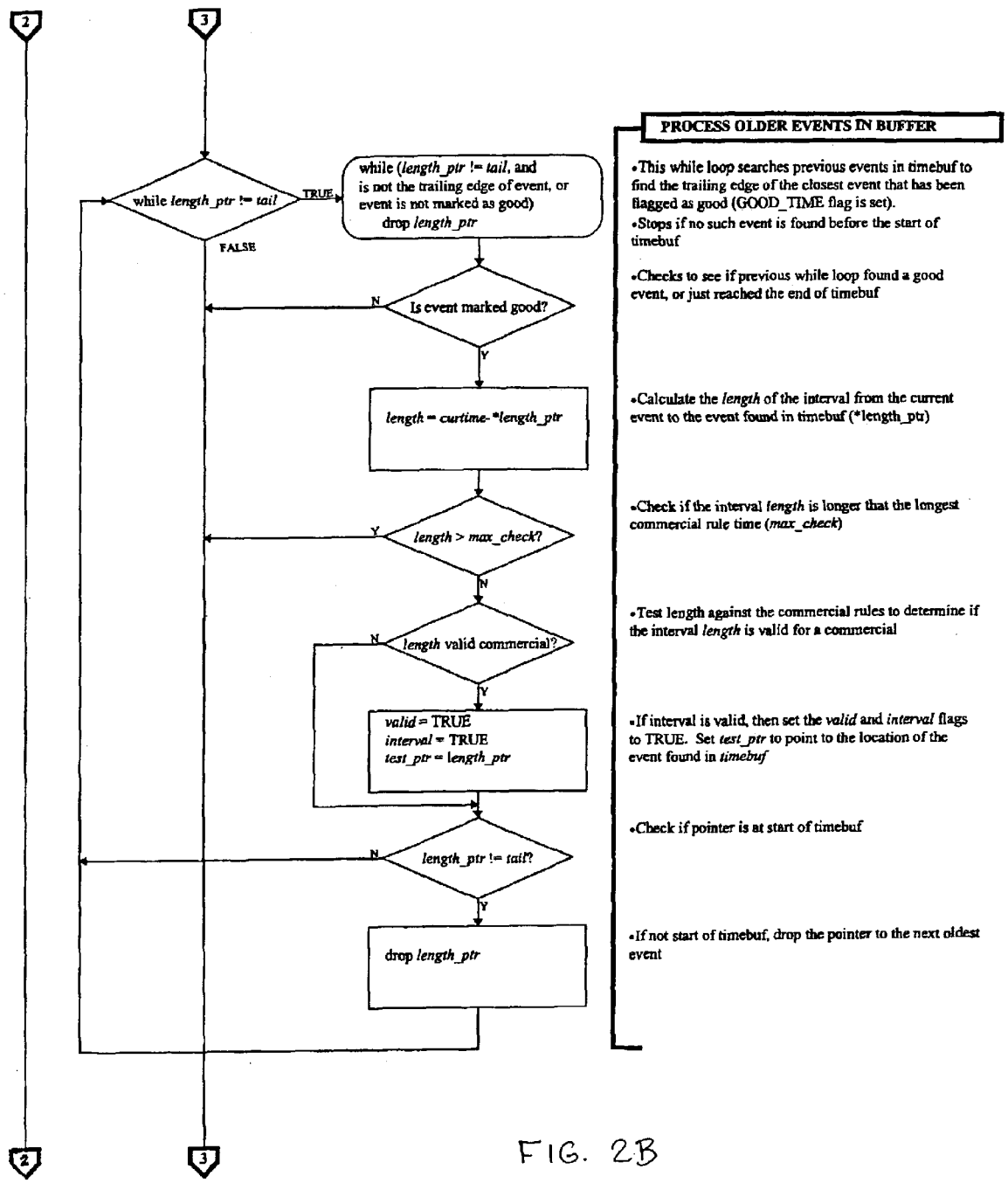
Figure 2C:
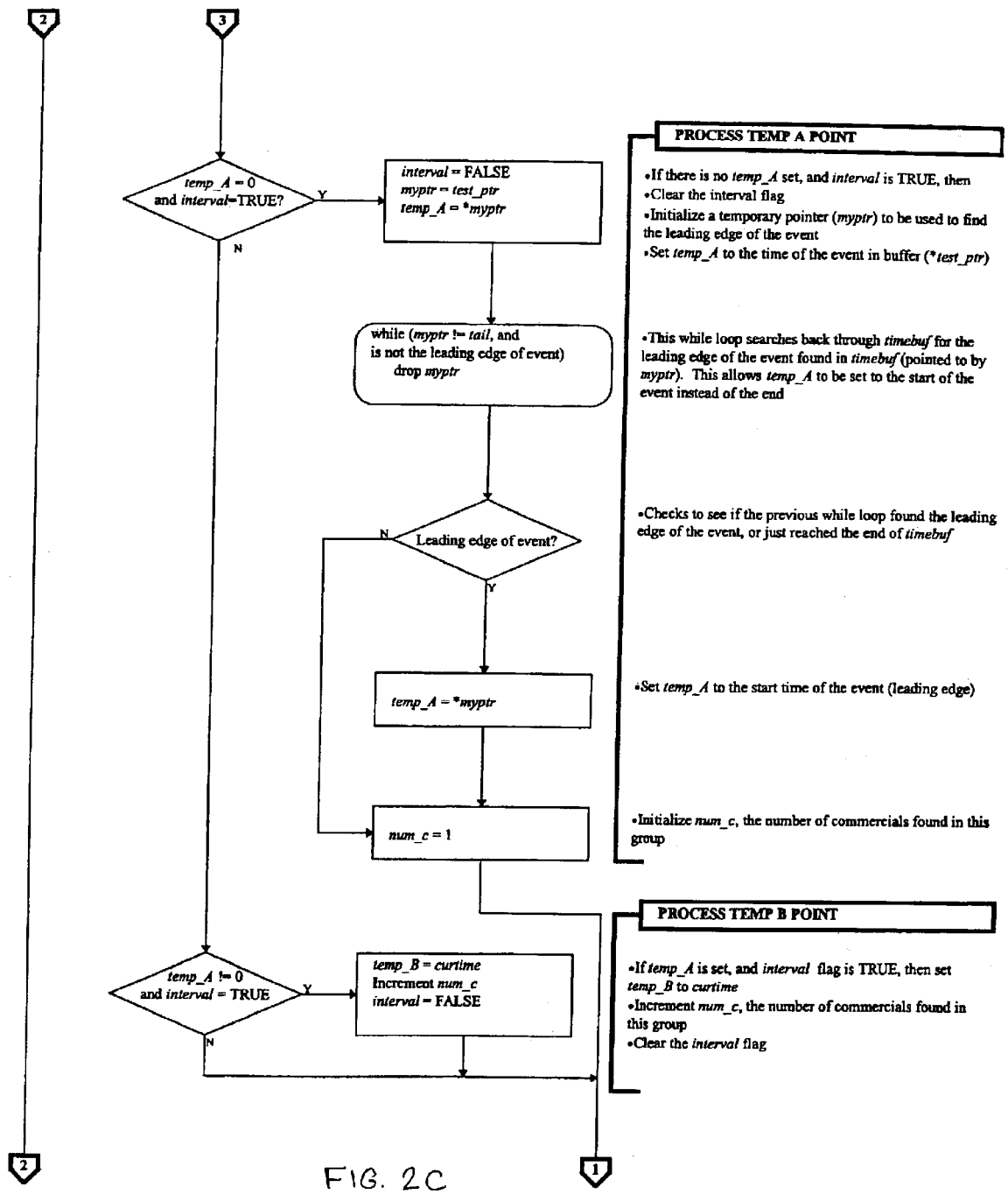
Figure 2D:
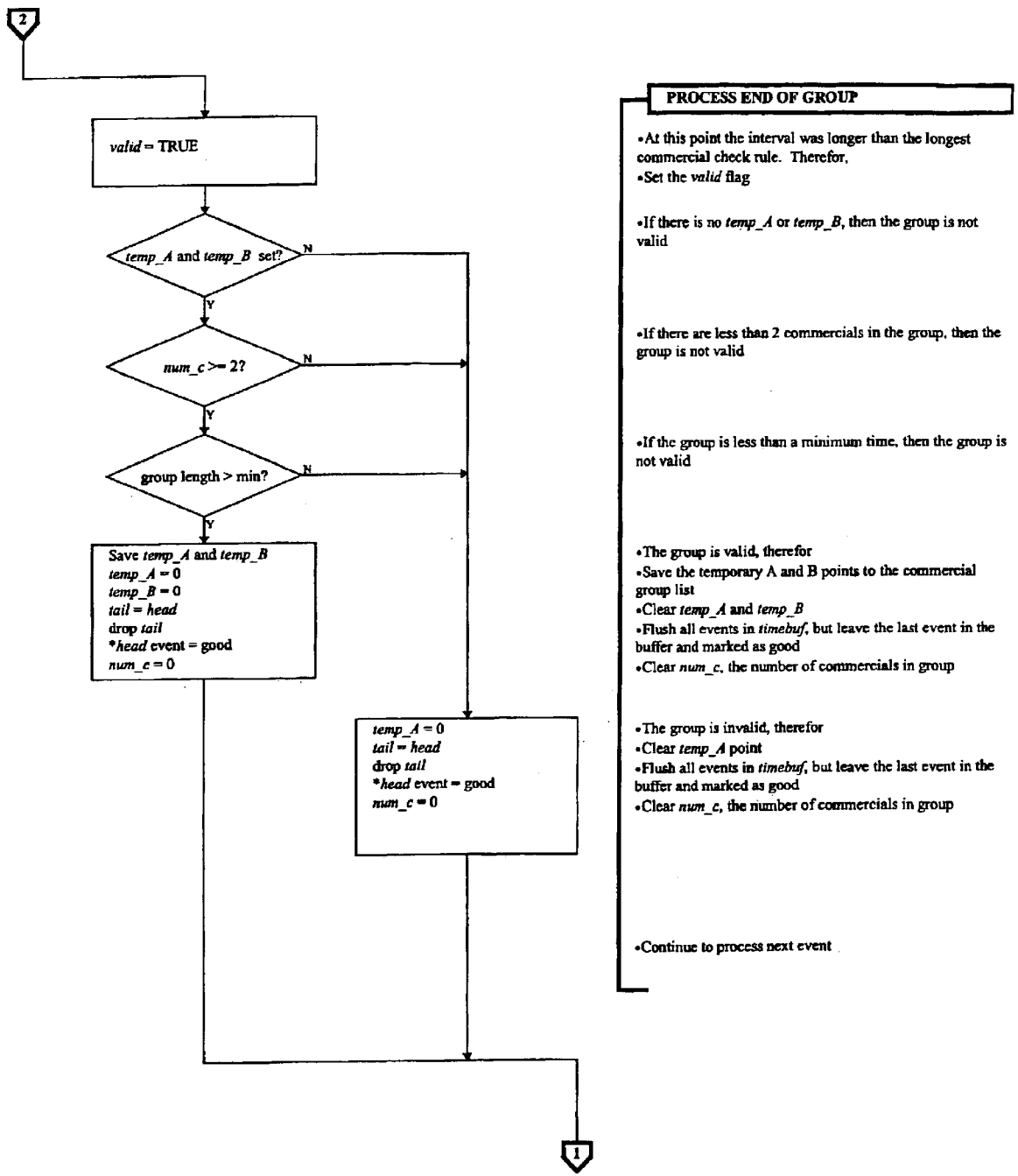

Black frames and similar events may be detected with hardware circuits that are known to those skilled in the art. However, an application specific integrated circuit for detecting events has been developed for use in COMMERCIAL ADVANCE® recorder products and is marketed by Panasonic (Matsushita Electronics) under the designation AN3275SB. FIG. 1 is a functional block diagram of a video cassette recorder (VCR) incorporating this integrated circuit. The circuit detects both video events (black frames) and audio events (silent frames) and provides discreet outputs (V DET, A DET) upon detection of the events.

The detected events are analyzed in processor 10, which may be a dedicated processor or may be the main microprocessor of the VCR. FIGS. 2A–2D present a functional flow diagram of an algorithm for analyzing events and detecting commercials and commercial groups. As each event occurs, the algorithm processes through a memory buffer that contains a list of the events occurring within a short time (61 seconds for North America) prior to the current event. The algorithm processes this buffer to determine if a prior event is stored that would indicate a valid commercial interval.

Valid commercials are determined by measuring the time interval between the current event and stored events that occurred up to the maximum time prior to the current event. The interval time is checked against several "commercial detection rules." These rules represent timing windows that indicate the detected interval is potentially a valid commercial.

For North American broadcast practices, the following basic rules are applied to identify potential commercials in a recording. Note that these timing measurements are made from the end of one event to the start of a subsequent event. This timing method reduces the effect of the random duration of the black event on the detection measurement.

An interval between two events is a commercial if the interval is:

Greater than 00.00 seconds and less than 35.00 seconds;

Greater than or equal to 38.00 seconds and less than 40.00 seconds;

Greater than or equal to 43.00 seconds and less than 47.00 seconds;

Greater than or equal to 56.00 seconds and less than 60.50 seconds.

These commercial rules are stored in an array variable called test_array. This array holds the time window limits for the various interval time checks used in the algorithm. A second variable, max_check, holds the longest time interval the algorithm will check for.

The process of scanning through the memory buffer is repeated as each event occurs. As this processing continues, the algorithm is able to determine the start and end point of a potential commercial group. At the end of the commercial group the algorithm applies a set of "grouping rules" to determine if the detected commercial group is valid. If the group is valid, the start and end points of the group are stored in a commercial group memory list.

Two variables are used to specify the rules for a valid commercial group. These grouping rules are min_commercials, which indicates the minimum number of commercials needed for a valid group, and min_group_time, which is the minimum time for a valid group.

For North American detection, the commercial detection and commercial grouping variables contain the following data:

Commercial Detection Rules:

| Variable | Values | Description |
| --- | --- | --- |
| test_array | 00.00, 35.00 | First check window (mm, max time in seconds) |
| | 38.00, 40.00 | Second check window |
| | 43.00, 47.00 | Third check window |
| | 56.00, 60.50 | Fourth check window |
| num_rules | 4 | The number of commercial detection rules |
| max_check | 60.50 | The maximum time to check for (in seconds) |

Commercial Grouping Rules:

| Variable | Values | Description |
| --- | --- | --- |
| min_commercials | 2 | Minimum number of commercials per group |
| min_group_time | 59.00 | Minimum group length (in seconds) |

Additional variables used in the algorithm are:

| Variable name | Purpose |
| --- | --- |
| num_c | Number of commercials found in a group |
| interval | Flags a valid interval, TRUE or FALSE |
| valid | Flag to indicate that a previous event is valid |
| timebuf[] | Buffer to hold timecodes |
| length_ptr | Pointer to the length of this interval in timebuf used to test interval lengths |
| test_ptr | Pointer to valid tested interval in timebuf |
| head | Pointer to the top of the timebuf buffer |
| tail | Pointer to the bottom of the timebuf buffer |
| goodtime | Previous valid timecode from timebuf |
| length | Length of a current interval in timebuf |
| temp_A | Temporary A point timecode from timebuf |
| temp_B | Temporary B point timecode from timebuf |
| curtime | Current timecode value from timebuf |
| delta | Delta to the current timecode |

The foregoing discussion has focused on commercial detection in the North American market. Somewhat different algorithms are required in other markets. For example, television commercials in Japan are very different than those found in North America. Commercials are typically 15 or 30 seconds in length in Japan. Longer commercials do occur—but are rare. Commercial groups can contain anywhere from 1 to over 10 minutes of commercials. Commercials are found before and after programs, as well as within programs. The black video events found in North America rarely exist in Japanese broadcasts. Instead, commercials are switched cleanly and precisely into programs. In order to accurately detect commercials in the Japanese market, event detection methods must be capable of detecting the video edits, or cuts, that occur between the television program and commercial.

Of course video cuts also occur quite frequently in normal non-commercial television programming. In order to differentiate from these "false" commercial events, audio detection is also used. Event detection in the Japanese market relies on audio detection to a much greater extent than in the North American market. The audio detector is very sensitive and provides a "skewing" function that matches drops in audio that occur shortly before or after the video cut is detected.

It has been determined that commercials in Japan are very precise in length as a result of having frame accurate switching of the commercial insertions. To detect commercials in Japan, the time between cuts is precisely measured in order to detect a potential commercial interval. Grouping algorithms then detect several of these commercials in order to find a commercial group. Once the commercial group has been identified, further processing is identical to that used in the North American market.

For Japan, the following basic rules have been found to accurately identify potential commercials and commercial groups. Note that these rules measure the time between cut events. The measurement must be accurate to within one frame.

An interval between two events is a commercial if the interval is:

Greater than or equal to 14.75 seconds and less than 15.20 seconds;

Greater than or equal to 29.70 seconds and less than 30.15 seconds.

A valid commercial group has at least one commercial, and the total length of the group is greater than or equal to 59.75 seconds.

Television commercials in the United Kingdom are very similar to those found in North America. The black video events found in North America are also found in the United Kingdom. Only a few design changes are needed to implement commercial detection in the United Kingdom. The differences include:

PAL video instead of NTSC;

Commercial detection rules are different;

Availability of broadcaster ID.

Commercial detection performance can be improved by selecting a particular software detection algorithm for a specific television network. European television employs a vertical blanking data system that is capable of indicating the name of the current network being recorded. The recorder can look up a specific algorithm for each network name to automatically select the appropriate commercial detection algorithm. For this approach, a user set-up screen will also be required to edit or add to this standard network table in order to further customize the application of commercial detection algorithms. This same method can also be used to inhibit commercial detection on broadcasts which are known to not contain commercials, such as BBC.

For the United Kingdom, the following basic rules have been found to accurately identify potential commercials and commercial groups. Note that these timing measurements are made from the end of one event to the start of a subsequent event. This timing method reduces the effect of the length of black or flat field events from the measurement.

An interval between two events is a commercial if the interval is:

Greater than 00.00 seconds and less than 65.50 seconds;

Greater than or equal to 77.00 seconds and less than 80.25 seconds;

Greater than or equal to 89.25 seconds and less than 91.50 seconds.

A valid commercial group has at least three commercials, and the total length of the group is greater than or equal to 55.00 seconds.

Continental Europe presents more of a challenge to commercial detection than either North American or Japan. This is due to several factors:

The European market consists of many individual countries;

Broadcasts originating in one country can be viewed in another country;

Black fields are not always present between commercials;

Solid color screens (flat fields) can exist between two commercials or between a commercial and program;

Cuts may separate commercials or a commercial and program;

PAL and SECAM formats are used in this market.

The detection of commercials in continental Europe is based on a set of detection methods and software algorithms. In order to perform across the wide range of television broadcasts found in continental Europe, no single detection method will provide optimal commercial elimination for all broadcast networks. Commercial detection in continental Europe is based on three major types of detection methods:

Black field;

Flat field;

Cut.

In many cases black video fields separate commercials in Europe as in North America. In fact, much of European prime time television originates from North America. However, in contrast to North America, some European networks insert colored screens between commercials. These "flat fields" can consist of blue, gray or white video screens. Since these screens are not detected by the black video detection hardware, other hardware approaches have been developed to identify these flat field events.

The basic commercial detection system uses a combination flat field and black field detection. This system is not overly complex and can detect close to 90% of all commercials found in continental Europe. The system will not perform well with a few networks, however, it will perform very well with most. Performance can be improved by selecting a particular software detection algorithm for a specific television network as explained above for the U.K. market.

For most all countries in continental Europe, the following basic rules have been found to accurately identify potential commercials and commercial groups. As for the U.K., these timing measurements are made from the end of one event to the start of a subsequent event.

An interval between two events is a commercial if the interval is:

Greater than 00.00 seconds and less than 65.50 seconds;

Greater than or equal to 77.00 seconds and less than 80.25 seconds;

Greater than or equal to 89.25 seconds and less than 91.50 seconds.

A valid commercial group has at least two commercials, and the total length of the group is greater than or equal to 55.00 seconds.

Figure 3:
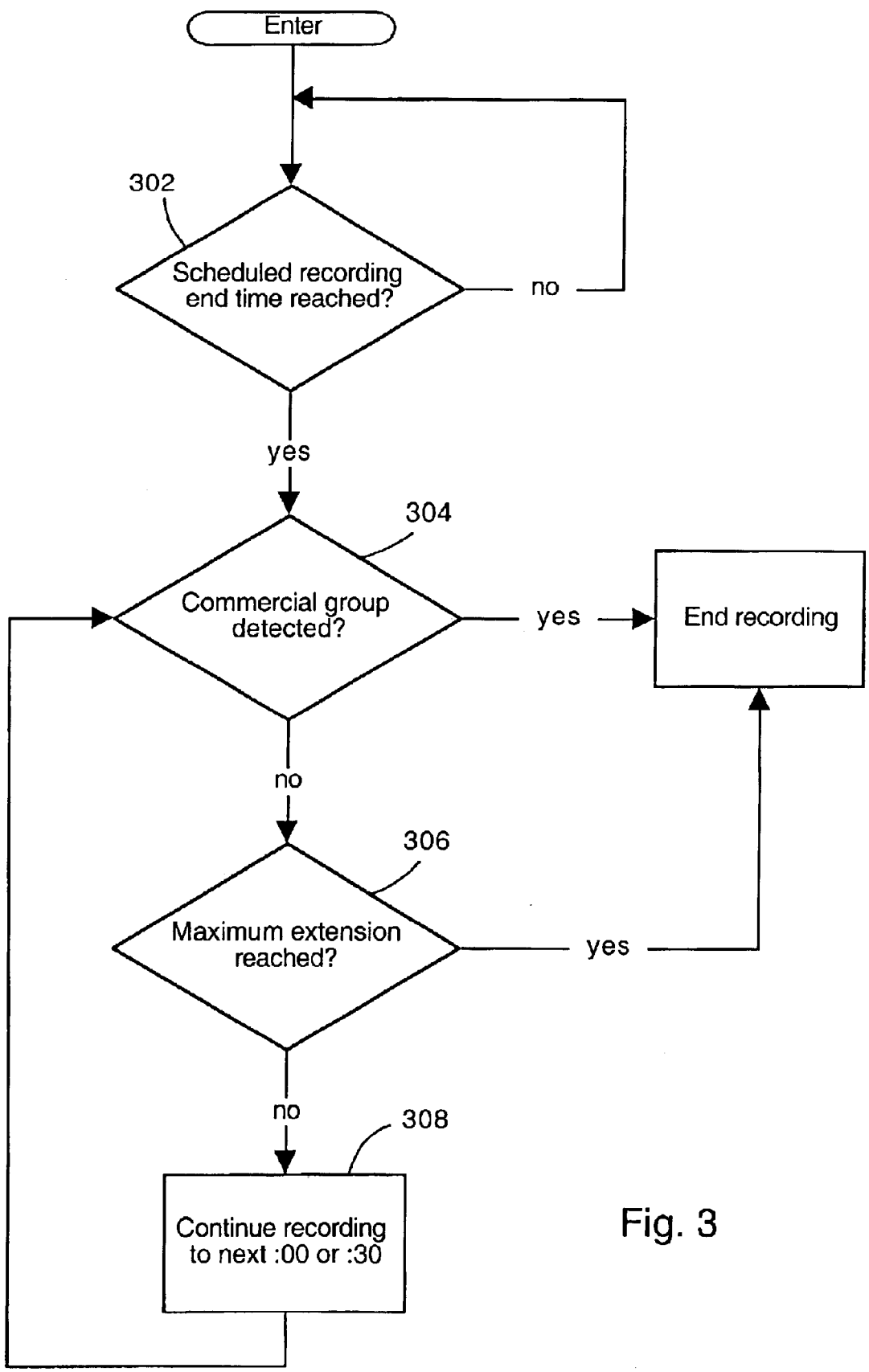
FIG. 3 is a functional flow diagram of a process for extending a programmed recording.

FIG. 3 is a functional block diagram for extending a programmed recording session in accordance with the present invention. The recording session is programmed in advance by any one of the various techniques implemented in commercially available recording products. This may involve manual entry of the channel, start time and end time or may simply involve a point and click operation on an interactive menu. Regardless of how the recording session is programmed, one of the programmed parameters is the scheduled recording end time. Beginning at step 302, the process illustrated in FIG. 3 checks to see if the scheduled recording end time has been reached. The process idles at step 302 until the test produces an affirmative response. Next, at step 304, the results of the commercial group detection process are interrogated to determine if a commercial group has been detected coincident with the scheduled recording end time. If so, the recording session is ended as scheduled. If not, it is presumed that the televised program has extended beyond the scheduled end time and the recording is continued. Recordings will only be extended for some predetermined maximum period of time, for example, one hour. At step 306, the process checks to see if the maximum extension has been reached. If so, the recording session is ended. If not, the recording continues to the next hour or half-hour as indicated at step 308.

When television programs extend beyond their scheduled end time, broadcasters typically try to restore the pre-established program schedule as soon as possible. Once the schedule is restored, commercial groups can be expected at each hour (e.g., 8:00, 9:00, 10:00, etc.) and often at the half-hour (e.g., 8:30, 9:30, 10:30, etc.). Thus, the presence of a commercial group at the hour or half-hour is an indication that the extended television program has ended and the normal television schedule has resumed. Thus, at the hour and half-hour, the process returns to step 304 to determine if a commercial group has been detected and to end the recording session if it has. Otherwise, the process continues until a commercial cluster is detected at an hour or half-hour or until the maximum extension is reached.

Although the present invention has been described with reference to a VCR, it will be recognized that the invention is equally applicable to digital video recorders. Indeed, the analog signals that are provided as inputs to the AN3275SB integrated circuit are internally available in many digital video recorders. In the case of a digital video recorder without such analog signals, video and analog events may be detected in the digital domain. Of course, it should be apparent that the present invention may be easily implemented in video recorders that already implement the COMMERCIAL ADVANCE® feature by merely adding software in the recorder's processor to execute the algorithm shown in FIG. 3.

It will be recognized that the above-described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A method of recording a television program comprising:
   receiving a television signal;
   designating a recording start time and a scheduled recording end time;
   beginning a recording of the television signal at the recording start time;
   examining the television signal to detect a commercial group proximate in time to the scheduled recording end time;
   ending the recording at the scheduled recording end time if the commercial group is detected, otherwise extending the recording.

2. The method of claim 1 wherein, if the commercial group is not detected, extending the recording to a next time of day increment.

3. The method of claim 2 wherein the next time of day increment is the first to occur of a next hour and a next half-hour.

4. The method of claim 1 wherein the scheduled end time is designated by adding a recording duration to the recording start time.

5. The method of claim 1 wherein the recording start time and scheduled recording end time are designated by selecting a program on an on-screen program guide.

6. The method of claim 1 wherein examining the television signal comprises detecting events therein.

7. The method of claim 6 wherein the events comprise block frames.

8. The method of claim 6 wherein the events comprise silent frames.

9. The method of claim 6 wherein the events comprise flat frames.

10. The method of claim 6 wherein the events comprise video cuts.

11. The method of claim 6 wherein examining the television signal further comprises analyzing time intervals between events.

12. A video recording device having internally stored instructions to execute a method comprising:
    receiving a television signal;
    designating a recording start time and a scheduled recording end time;
    beginning a recording of the television signal at the recording start time;
    examining the television signal to detect a commercial group proximate in time to the scheduled recording end time;
    ending the recording at the scheduled recording end time if the commercial group is detected, otherwise extending the recording.

13. The video recording device of claim 12 wherein, if the commercial group is not detected, extending the recording to a next time of day increment.

14. The video recording device of claim 13 wherein the next time of day increment is the first to occur of a next hour and a next half-hour.

15. The video recording device of claim 12 wherein examining the television signal comprises detecting events therein.

16. The video recording device of claim 15 wherein the events comprise black frames.

17. The video recording device of claim 15 wherein the events comprise silent frames.

18. The video recording device of claim 15 wherein the events comprise flat frames.

19. The video recording device of claim 15 wherein the events comprise video cuts.

20. The video recording device of claim 15 wherein examining the television signal further comprises analyzing time intervals between events.

* * * * *